2,803,637

ORGANOSILOXANE ALDEHYDES

John L. Speier, Pittsburgh, Pa., assignor to Dow Corning Corporation, Midland, Mich., a corporation of Michigan No Drawing. Application January 18, 1954, Serial No. 404,803

4 Claims. (Cl. 260—448.2)

This invention relates to organosilicon compounds having aldehyde groups attached to the silicon. This application is a continuation-in-part of my copending application Serial No. 398,899 filed December 17, 1953, entitled, "Organosiloxane Aldehydes," now abandoned.

The term "organo functional group" as employed hereinafter refers to an organic group attached to a silicon by Si—C bonds which group also contains a functional organic group substituted therein (i. e., COOH, OH, NH$_2$, CHO, etc.). The term "organo functional silicon compound" refers to an organo silicon compound containing an organo functional group.

Organo silicon compounds containing organo functional groups which have previously been prepared are generally those containing four nonhydrolyzable groups attached to the silicon. These materials cannot be polymerized to siloxanes without cleavage of one of the organic groups. This group cleavage is practical only when the organo functional group appears on a silicon atom containing 3 methyl groups or 3 phenyl groups or a combination of these groups. In such cases the functional organo silicon compounds can be polymerized to siloxanes by cleavage of a methyl or a phenyl radical by concentrated sulphuric acid followed by hydrolysis of the resulting silyl sulphate. However, the siloxanes so prepared are inherently dimeric materials which are not capable of further siloxane polymerization. As a consequence the organo functional siloxanes heretofore known have been limited in their applicability.

One of the primary objects of this invention is to prepare aldehyde substituted siloxanes which have greater flexibility of application than has heretofore been possible with such materials. Another object is to prepare functional organosilicon compounds which can be reacted directly with phenols to form silicon-modified phenol-aldehyde resins. Another object is to provide aldehyde substituted siloxanes which are commercially feasible. Other objects and advantages will be apparent from the following description.

This invention relates to siloxanes of the formula (OHCR)R'SiO in which R is a saturated divalent aliphatic or cycloaliphatic hydrocarbon radical wherein the oxygen atom of the carbonyl group is at least 3 carbon atoms away from the silicon and R' is a monovalent hydrocarbon radical or a halogenated monovalent hydrocarbon radical free of aliphatic unsaturation.

The siloxanes of this invention are prepared by hydrolyzing silanes of the formula [(R"O)$_2$HCR]R'SiH$_2$ in which R" is an alkyl radical, and R and R' are as above defined. The removal of the hydrogen is carried out by adding the silane to an alkaline hydrolysis medium. The acetal groups are thereafter removed by hydrolyzing the resulting siloxane in an acid medium.

The silane acetals shown above are prepared by reacting unsaturated acetals with silanes of the formula R'SiH$_3$ in which R' is as above defined. The reaction is best carried out by heating a mixture of the acetal and the silane at temperatures from 50 to 150° C. If desired, catalysts such as t-butylperbenzoate and benzoyl peroxide may be employed. The reaction involves the addition of the silane to the unsaturated linkage in the acetal and may be represented schematically as follows:

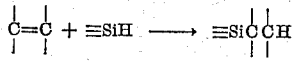

It is necessary to employ an acetal rather than the corresponding aldehyde in this reaction in order to prevent the reaction of the active hydrogen of the aldehyde with the silane H radicals thereby producing complicated undesirable by-products.

For the purpose of this invention the unsaturated acetals employed to react with the silane can be any aliphatic unsaturated acetal such as acroleindimethylacetal, undecenyldiethylacetal, and octadecenyldimethylacetal, and any unsaturated cycloaliphatic acetals such as

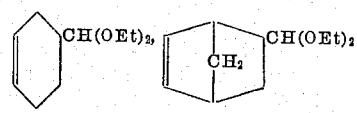

and

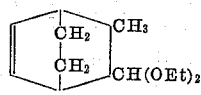

The location of the double bond in the acetal employed must be such that after addition to the silane and hydrolysis, the silicon atom shall be at least 3 carbon atoms away from the oxygen atom of the carbonyl group. In other words, the oxygen atom must be on a carbon atom at least λ to the silicon. Consequently, R in the siloxane formula shown above cannot be less than 2 carbon atoms. The reason for this is that siloxanes having carbonyl groups substituted thereon in which the oxygen is on a carbon α or β to the silicon are hydrolytically unstable, i. e., the aldehyde group tends to cleave at the Si—C linkage when subjected to alkaline or acid conditions.

From the above it can be seen that R can be, for example, propylene, butylene, octadecenylene, cyclohexalene, cyclopentylene

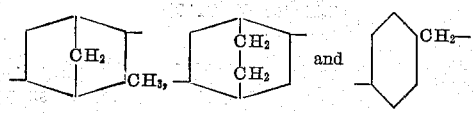

The unsaturated cyclic acetals may be prepared by the well-known Diels-Alder reaction which involves the addition of an unsaturated aldehyde to a 1,4-conjugated diene system. The acetals are prepared from the aldehydes by reacting the latter with an alcohol.

In the organosilicon compounds of this invention R' can be any monovalent hydrocarbon radical free of aliphatic unsaturation such as alkyl radicals such as methyl, ethyl, octadecyl; cyclo alkyl radicals such as cyclohexyl and cyclopentyl; and aromatic hydrocarbon radicals such as phenyl, benzyl, tolyl, naphthyl, and xenyl. R' can also be any halogenated monovalent hydrocarbon radical free of aliphatic unsaturation such as chlorophenyl, dibromoxenyl, tetrafluoroethyl, pentafluorobutyl, and α,α,α-trifluorotolyl.

The organo functional siloxanes of this invention can be copolymerized with any other siloxanes of the formula

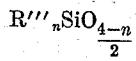

where R''' is any monovalent hydrocarbon radical or any halogenated monovalent hydrocarbon radical and n has an average value from 1 to 3 inclusive. The copolymerization is best carried out by cocondensing the functional organo siloxanes of this invention with the other siloxanes by means of siloxane bond rearrangement. The relative amount of the functional organosiloxanes of this invention can be varied to any extent, for example, from .001 to 99.999 mol percent of the copolymer.

The siloxane aldehydes of this invention either alone or when copolymerized with other siloxanes can be reacted via the carbonyl group with phenol and modified phenols to form siloxane modified phenol-aldehyde resins. In carrying out this reaction the siloxane can be the only source of carbonyl groups or the siloxane aldehydes can be employed along with organic aldehydes such as formaldehyde, acetaldehyde, and the like. For example, a mixture of the siloxane of Example 2 infra and formaldehyde can be reacted with phenol to give a resin in which the siloxane is joined to the organic portion of the resin by Si—C linkages. These resins are much more stable to moisture than heretofore known silicone modified phenol-aldehyde resins in which the silicon compound was tied into the resin by Si—O—C linkages. These linkages are hydrolytically unstable.

The functional organosiloxanes of this invention either alone or when copolymerized with other siloxanes or other organic resins are useful for coating compositions.

The following examples are illustrative only and should not be construed as limiting the invention which is properly set forth in the appended claims.

Example 1

32.3 g. of monophenylsilane was heated under nitrogen to 90° C. as a mixture of 29.4 g. of undecenyldiethylacetal and 1.2 g. of t-butylperbenzoate was added slowly over a period of 3 hours. The temperature was thereafter maintained at 90–95° C. for 18 hours. Upon distillation of the product a theoretical yield of the compound $C_6H_5SiH_2(CH_2)_{10}CH(OEt)_2$, $n_D^{25}$ 1.4972 and $d_4^{25}$ of .9415 was obtained.

12 g. of the above silane-acetal was hydrolyzed first with dilute sodium hydroxide and then with dilute hydrochloric acid. After washing away the sodium chloride and evaporating the excess solvents and other volatile material, a viscous, fluid, partially condensed siloxane having the unit formula

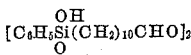

was obtained. When this material is heated in the presence of an alkaline catalyst, a completely condensed siloxane having the unit formula

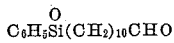

is obtained.

Example 2

A mixture of 40 g. of acroleindiethylacetal and 3 g. t-butylperbenzoate was added over a period of 2 hours to 81 g. of monophenylsilane which had previously been heated to 95° C. in a nitrogen atmosphere. The temperature rose to 113° C. during the addition. The mixture was left on a steam bath for 22 hours. Distillation of the resulting material gave a 54% yield of 3-phenylsilyldiethoxypropane,

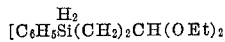

B. P. 162.5° C. at 25 mm., $n_D^{25}$ 1.4882 and $d_4^{25}$ .9451.

12 g. of this product was dissolved in alcohol and hydrolyzed first with dilute NaOH and then by dilute HCl. The sodium chloride was washed away and the alcohol evaporated under vacuum leaving a slightly cloudy viscous siloxane fluid having the unit formula

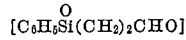

Example 3

When 1 mol of acroleindiethylacetal is reacted with 1 mol of methylsilane (MeSiH₃) in accordance with the method of Example 2 the compound

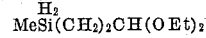

is obtained.

When this silane is hydrolyzed by the method of Example 1 the viscous siloxane having the unit formula

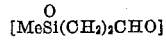

is obtained.

Example 4

When 1 mol of the acetal

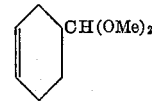

is reacted with 1 mol of butylsilane ($C_4H_9SiH_3$) in the manner of Example 2 the compound

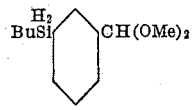

is obtained.

When this material is hydrolyzed in accordance with the method of Example 1 the siloxane having the unit formula

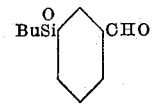

is obtained.

Example 5

When a mixture of the siloxanes

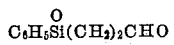

$C_6H_5(CH_3)SiO$ and $ClC_6H_4(CH_3)SiO$ is heated together with a catalytic amount of KOH, a copolymeric siloxane containing all three siloxane units is obtained.

When 1 g. mol of the siloxane

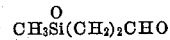

is heated in toluene solution with a copolymer of 1 g. mol of monovinylsiloxane and 1 g. mol of dimethylsiloxane in the presence of a catalytic amount of KOH, a copolymeric siloxane having the composition 33⅓ mol percent

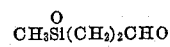

33⅓ mol percent monovynylsiloxane and 33⅓ mol percent dimethylsiloxane is obtained.

That which is claimed is:

1. A siloxane having the unit formula (OHCR)R′SiO in which R is selected from the group consisting of divalent saturated aliphatic hydrocarbon and cycloaliphatic hydrocarbon radicals, in which the oxygen of the carbonyl group is at least 3 carbon atoms away from the silicon and R′ is selected from the group consisting of monovalent hydrocarbon radicals and halogenated monovalent hydrocarbon radicals free of aliphatic unsaturation.

2. A siloxane having the unit formula $$C_6H_5\overset{O}{\underset{}{Si}}(CH_2)_2CHO$$

3. A siloxane having the unit formula $$MeSi\overset{O}{\underset{}{}}(CH_2)_2CHO$$

4. A siloxane having the unit formula $$C_6H_5\overset{O}{\underset{}{Si}}(CH_2)_{10}CHO$$

References Cited in the file of this patent

UNITED STATES PATENTS

| 2,588,083 | Burkhard et al. | Mar. 4, 1952 |
| 2,641,605 | Frisch et al. | June 9, 1953 |

FOREIGN PATENTS

| 961,878 | France | Nov. 28, 1949 |

OTHER REFERENCES

Sommer et al.: "Am. Chem. Soc., Jr.," vol. 72 (1950), p. 1935.